(12) United States Patent
Jung et al.

(10) Patent No.: US 9,137,777 B2
(45) Date of Patent: Sep. 15, 2015

(54) BASE STATION, MOBILE STATION, PAGING MESSAGE TRANSMITTING METHOD, AND PAGING MESSAGE RECEIVING METHOD

(75) Inventors: Soojung Jung, Daejeon (KR); Eunkyung Kim, Daejeon (KR); Jae Sun Cha, Daejeon (KR); Sung Cheol Chang, Daejeon (KR); Hyun Lee, Daejeon (KR); Chul Sik Yoon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 105 days.

(21) Appl. No.: 13/582,914

(22) PCT Filed: Mar. 4, 2011

(86) PCT No.: PCT/KR2011/001530
§ 371 (c)(1),
(2), (4) Date: Sep. 5, 2012

(87) PCT Pub. No.: WO2011/108897
PCT Pub. Date: Sep. 9, 2011

(65) Prior Publication Data
US 2012/0327856 A1 Dec. 27, 2012

(30) Foreign Application Priority Data

Mar. 5, 2010 (KR) .......................... 10-2010-0020093
Mar. 4, 2011 (KR) .......................... 10-2011-0019663

(51) Int. Cl.
*H04W 4/10* (2009.01)
*H04W 68/00* (2009.01)

(52) U.S. Cl.
CPC .................................. *H04W 68/005* (2013.01)

(58) Field of Classification Search
None
See application file for complete search history.

(56) References Cited

U.S. PATENT DOCUMENTS

| | | | |
|---|---|---|---|
| 2003/0088695 A1* | 5/2003 | Kwak et al. | 709/238 |
| 2007/0042814 A1* | 2/2007 | Kakimoto et al. | 455/574 |
| 2007/0047486 A1 | 3/2007 | Lee et al. | |
| 2009/0318170 A1 | 12/2009 | Lee et al. | |
| 2010/0067454 A1 | 3/2010 | Lee et al. | |
| 2010/0110953 A1 | 5/2010 | Kim et al. | |
| 2011/0292856 A1* | 12/2011 | Park et al. | 370/311 |

FOREIGN PATENT DOCUMENTS

| | | |
|---|---|---|
| KR | 10-2007-0073635 A | 7/2007 |
| KR | 10-2008-0039816 A | 5/2008 |
| KR | 10-2008-0086406 A | 9/2008 |
| KR | 10-2010-0042209 A | 4/2010 |

* cited by examiner

*Primary Examiner* — Anez Ebrahim
(74) *Attorney, Agent, or Firm* — Rabin & Berdo, P.C.

(57) ABSTRACT

A base station transmits a first message including indices of a plurality of carriers and information for the plurality of carrier to a mobile station. Also, the base station transmits a second message including a bitmap representing whether each of the plurality of carriers corresponds to a paging carrier used for transmitting a paging message, to the mobile station. The base station selects a paging transmission carrier for the mobile station from among the plurality of carriers and transmits a paging message through the selected paging transmission carrier.

14 Claims, 12 Drawing Sheets

FIG. 4

$$\text{bitmap size} = \sum_{i=1}^{\text{Number of carrier group}} \text{Number of carries in group\#i}$$

| 0 | 1 | 1 | ... | 0 | ... | 0 |

Physical carrier index =
physical carrier index of 3$^{rd}$
carrier in AAI_Global_Config

FIG. 8

Bitmap size = serving BS carrier Number in AAI_MC-ADV

| 0 | 1 | 1 | ... | 0 | ... | 0 |

Physical carrier index = physical carrier index of 3$^{rd}$ carrier in AAI_MC-ADV

FIG. 10

Bitmap size = serving BS carrier Number in AAI_NBR-ADV

| 0 | 1 | 1 | ... | 0 | ... | 0 |

Physical carrier index = physical carrier index of 3$^{rd}$ carrier in AAI_NBR-ADV

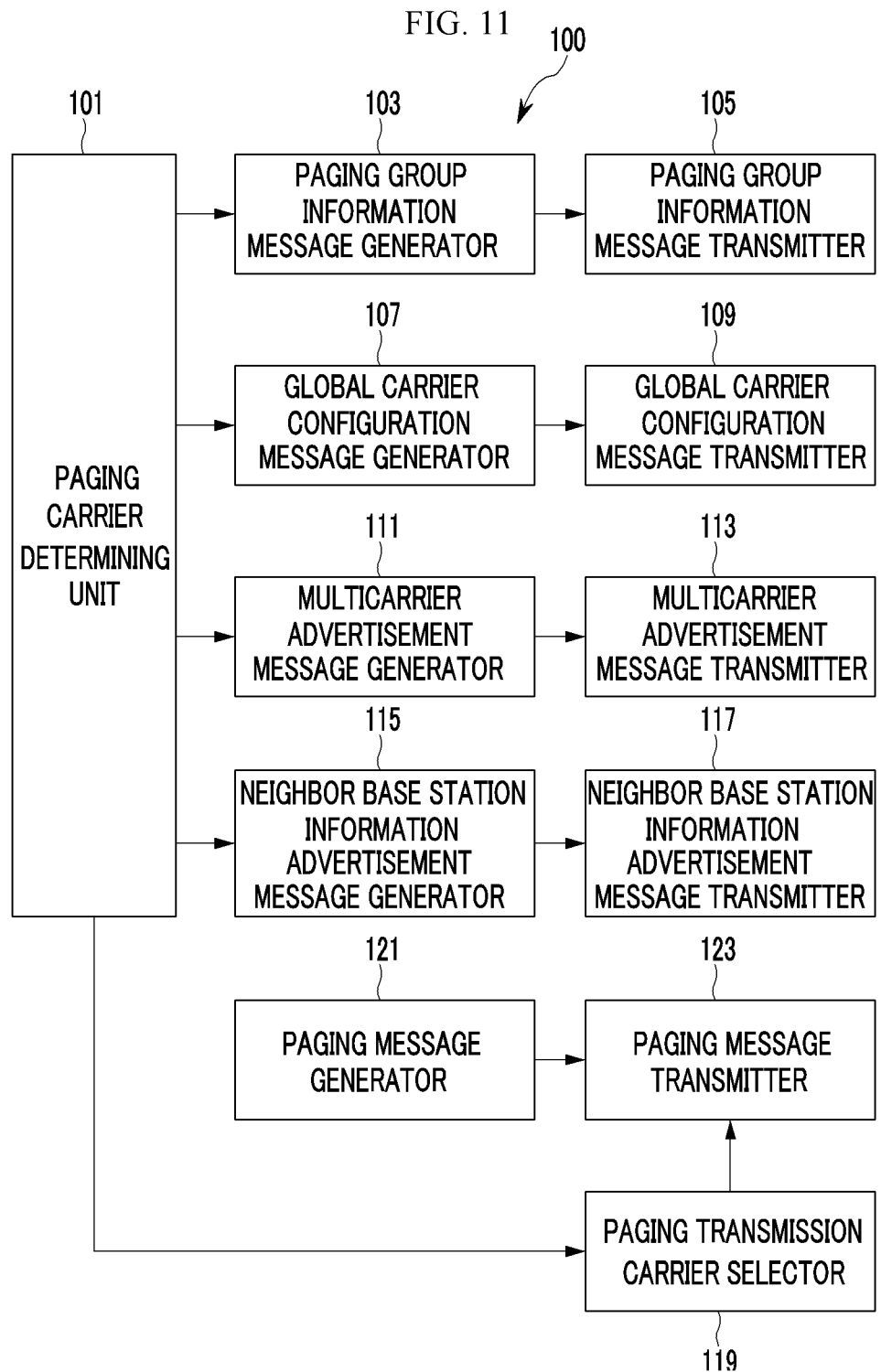

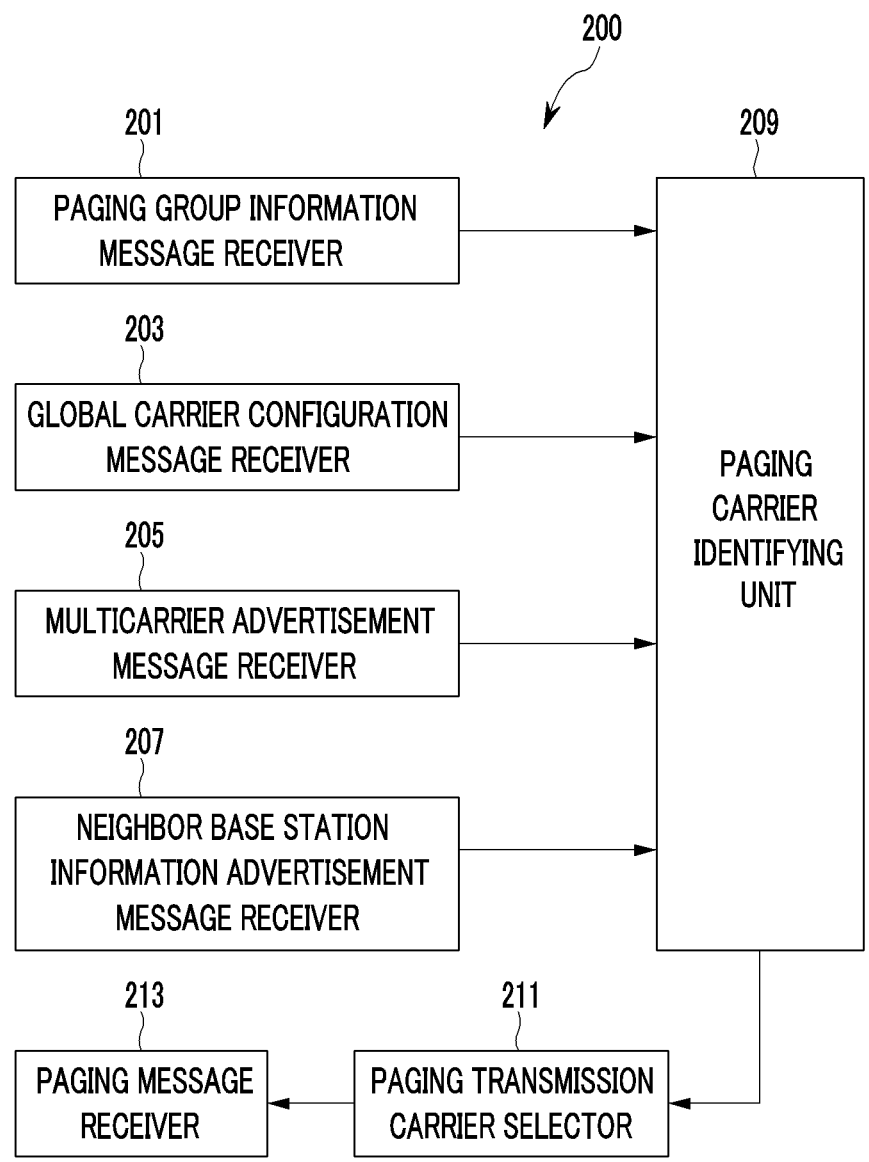

BASE STATION, MOBILE STATION, PAGING MESSAGE TRANSMITTING METHOD, AND PAGING MESSAGE RECEIVING METHOD

TECHNICAL FIELD

The present invention relates to a base station and a mobile station. In particular, the present invention relates to a paging message transmitting method of the base station and a paging message receiving method of the mobile station.

BACKGROUND ART

In a mobile communication system, a paging group information message (PGID_Info message) corresponding to a broadcast message can be used for providing paging-related information of the base station. The paging group information message can be transmitted through all carriers (or frequency assignments (FA) or component carriers) supported by the base station. The paging group information message can include fields shown in Table 1.

TABLE 1

| Name | Value |
| --- | --- |
| Num_PGIDs | Number of paging groups in the base station |
| PGID | Identifier of paging group (0~$2^{16}$) |
| m | Time domain hash parameter (1~4) used to determine the frame number of a superframe for paging message transmission of an idle mode AMS |

In Table 1, the Num_PGIDs field represents the number of paging groups supported by the base station. The PGID field represents a paging group identifier. The paging group information message can include a plurality of paging group identifiers. The number of paging group identifiers can correspond to the number represented by the Num_PGIDs field. The m field represents a time domain hash parameter which the mobile station uses to determine a frame number for transmitting a paging message among multiple frames within a superframe including a paging reception interval.

In the other hand, the base station can provide information necessary for multicarrier support to the mobile station through a global carrier configuration message such as an AAI_Global_Config message and a multicarrier advertisement message such as an AAI_MC_ADV message.

The global carrier configuration message is a message for providing carrier information for all available carriers in a network that the base station belongs to. The global carrier configuration message provides information on the number of the entire carrier groups in the network composed of adjacent carriers continuously located in a frequency region and information on individual carriers composing each carrier group. The carrier group information includes bandwidth of component carriers of each carrier group, and start frequency information. The individual carrier information includes a physical carrier index and information on the duplexing mode. The physical carrier index is for identifying all carriers supported by the network to which the corresponding base station belongs. After the mobile station performs initial access to a system through the base station, the base station transmits the global carrier configuration message to the mobile station. All base stations that belong to the same network provide the global carrier configuration messages with the same content.

The multicarrier advertisement message provides information on multiple carriers that the base station can support. By using the physical carrier index provided through the global carrier configuration message, the multicarrier advertisement message provides information on a secondary advanced preamble index (SA-Preamble index), a MAC protocol version, a super frame header (SFH), etc. for each of carriers which the base station can support.

In a mobile wireless access system supporting multicarriers, mobile stations in an idle mode state within the base station can receive a paging message through different carriers. Also, the base station can only use some carriers among multiple carriers supported by the base station to transmit the paging message.

It is necessary to provide information for determining a carrier for transmitting the paging message of the corresponding mobile station and information on carriers used for transmitting paging messages within the base station so that the mobile station can receive the paging message in the idle mode. A carrier which is used for transmitting the paging message of the corresponding mobile station can be determined by using a specific equation.

However, the conventional paging group information message, global carrier configuration message, and multicarrier advertisement message do not provide paging-related information on each of carriers necessary for transmitting the paging message through multiple carriers.

DISCLOSURE

Technical Problem

The present invention has been made in an effort to provide a method having advantages of providing paging-related information to a mobile station when a paging message is transmitted through multicarriers and using the same so that the paging message is received without loss.

Technical Solution

An exemplary embodiment of the present invention provides a method for a base station to transmit a paging message. The method includes transmitting a first message including indices of a plurality of carriers and information for the plurality of carriers to a mobile station; transmitting a second message including a bitmap representing whether each of the plurality of carriers corresponds to a paging carrier used for transmitting the paging message, to the mobile station; selecting a paging transmission carrier for the mobile station from among at least one paging carrier; and transmitting the paging message through the paging transmission carrier.

Here, the second message may further include paging group information. The second message may be transmitted in a broadcast fashion.

The first message may correspond to a message for providing information on all available carriers in a network, and the size of the bitmap may be equal to the number of all the available carriers. The first message may be transmitted in a unicast fashion. The plurality of carriers may correspond to carriers supported by the base station, and the first message may correspond to a message for providing carrier information of the base station.

The first message may be transmitted in a broadcast fashion. The plurality of carriers may correspond to carriers supported by a neighbor base station, and the first message may correspond to a message for providing information of the neighbor base station.

Another embodiment of the present invention provides a method for a mobile station to receive a paging message. The method includes: receiving a first message including indices of a plurality of carriers and information for the plurality of carriers from a base station; receiving a second message including a bitmap representing whether each of the plurality of carriers corresponds to a paging carrier used for transmitting the paging message, from the base station; selecting a paging transmission carrier for the mobile station from among at least one paging carrier; and monitoring the paging message through the paging transmission carrier.

Here, the second message may further include paging group information and may be transmitted in a broadcast fashion.

The first message may correspond to a message for providing information on all available carriers in a network, and the size of the bitmap may be equal to the number of all the available carriers. The first message may be transmitted in a unicast fashion.

Yet another embodiment of the present invention provides a base station. The base station includes a first message transmitter for transmitting a first message including indices of a plurality of carriers to a mobile station; a second message transmitter for transmitting a second message including information representing whether each of the plurality of carriers is used for transmitting a paging message, to the mobile station; and a paging message transmitter for transmitting the paging message through at least one among a plurality of carriers used for transmitting the paging message.

Here, the second message may correspond to a broadcast message further including paging group information.

The first message may correspond to a unicast message for providing information on all available carriers in a network.

The information representing whether each of the plurality of carriers is used for transmitting the paging message may be correspond to a bitmap, and the size of the bitmap may be equal to the number of all the available carriers.

Yet another embodiment of the present invention provides a mobile station. The mobile station includes a first message receiver for receiving a first message including indices of a plurality of carriers and information for the plurality of carriers from a base station; a second message receiver for receiving a second message including information representing whether each of the plurality of carriers is used for transmitting a paging message, from the base station; and a paging message receiver for receiving the paging message through at least one among a plurality of carriers used for transmitting the paging message.

Here, the second message may correspond to a broadcast message further including paging group information. The first message may correspond to a unicast message for providing information of all available carriers in a network, the information representing whether each of the plurality of carriers is used for transmitting a paging message may correspond to a bitmap, and the size of the bitmap may be equal to the number of all the available carriers.

Yet another embodiment of the present invention provides a method for a base station to transmit a paging message. The method includes transmitting a broadcast message including information representing indices of a plurality of paging carriers to a mobile station; selecting a paging transmission carrier for the mobile station among the plurality of paging carriers; and transmitting the paging message through the paging transmission carrier.

Here, the broadcast message may further include paging group information.

The information representing indices of the plurality of paging carriers may correspond to a bitmap, and the size of the bitmap is equal to the number of all available carriers in a network. The information representing indices of the plurality of paging carriers may correspond to a list of indices of the plurality of paging carriers.

Yet another embodiment of the present invention provides a mobile station. The mobile station includes: a broadcast message receiver for receiving a broadcast message including paging group information and information representing indices of a plurality of paging carriers from a base station; a paging transmission carrier selector for selecting a paging transmission carrier for the mobile station from among the plurality of paging carriers; and a paging message receiver for receiving a paging message through the paging transmission carrier.

Here, the information representing indices of the plurality of paging carriers may correspond to a bitmap, and the size of the bitmap is equal to the number of all available carriers in a network.

The information representing indices of the plurality of paging carriers may correspond to a list of indices of the plurality of paging carriers.

Yet another embodiment of the present invention provides a method for a base station to transmit a paging message. The method includes: transmitting a first message including indices of a plurality of carriers and information representing whether each of the plurality of carriers corresponds to a paging carrier used for transmitting the paging message, to a mobile station; selecting a paging transmission carrier for the mobile station among one or more paging carriers; and transmitting the paging message through the paging transmission carrier.

Here, the plurality of carriers may correspond to carriers supported by a neighbor base station, and the first message may correspond to a message for providing carrier information of the neighbor base station.

The plurality of carriers may correspond to carriers supported by the base station, and the first message may correspond to a broadcast message for providing carrier information of the base station.

Yet another embodiment of the present invention provides a mobile station. The mobile station includes: a first message receiver for receiving a first message including indices of a plurality of carriers and information representing whether each of the plurality of carriers corresponds to a paging carrier used for transmitting a paging message, from a base station; a paging transmission carrier selector for selecting a paging transmission carrier for the mobile station from among one or more paging carriers; and a second message receiver for monitoring the paging message through the paging transmission carrier.

Here, the plurality of carriers may correspond to carriers supported by a neighbor base station, and the first message may correspond to a message for providing carrier information of the neighbor base station.

The plurality of carriers may correspond to carriers supported by the base station, and the first message may correspond to a broadcast message for providing carrier information of the base station.

Advantageous Effects

According to the exemplary embodiments of the present invention, it is possible to efficiently inform a mobile station of related information when a paging message is transmitted through multicarriers. Further, the mobile station can receive the paging message without loss by using the related information.

DESCRIPTION OF THE DRAWINGS

FIG. 4 shows a method for interpreting a bitmap according to the second exemplary embodiment of the present invention.

FIG. 8 shows a method for interpreting a bitmap according to the fifth exemplary embodiment of the present invention.

FIG. 10 shows a method for interpreting a bitmap according to the sixth exemplary embodiment of the present invention.

FIG. 11 shows a block diagram of a base station according to an exemplary embodiment of the present invention.

FIG. 12 shows a block diagram of a mobile station according to an exemplary embodiment of the present invention.

MODE FOR INVENTION

Figure 1:
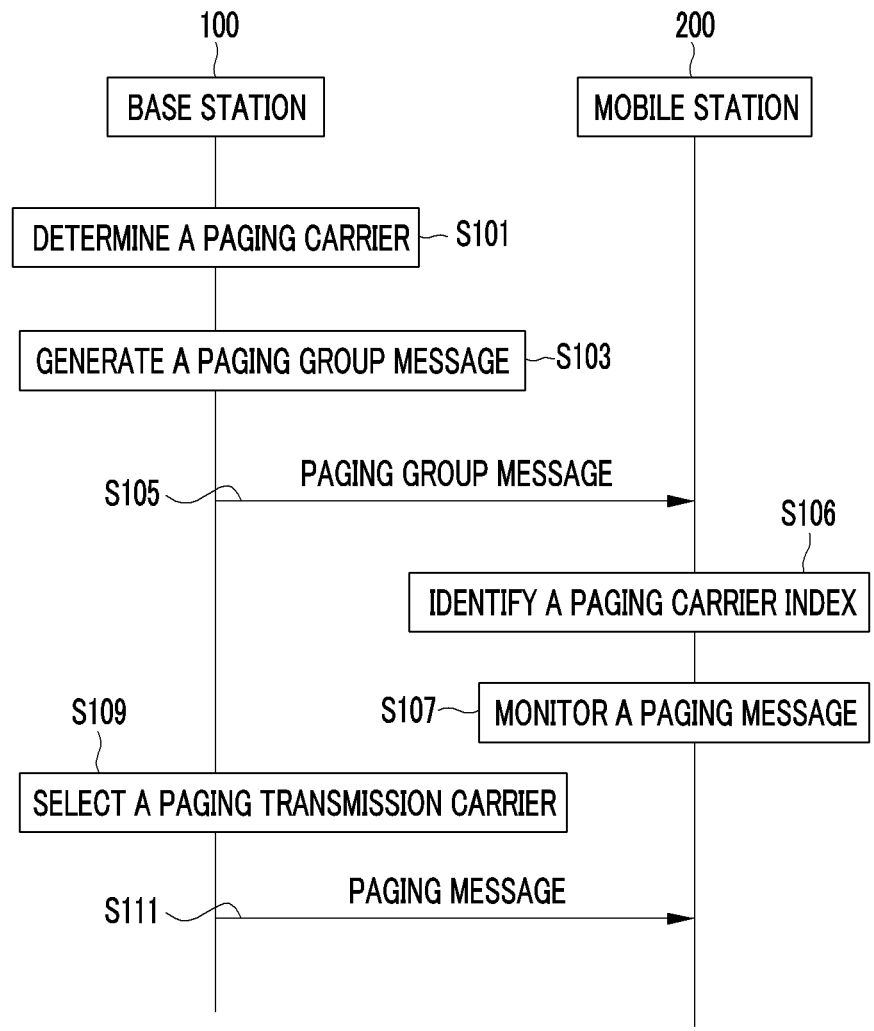
FIG. 1 shows a method for paging according to the first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Through the specification, in addition, unless explicitly described to the contrary, the word "comprise" and variations such as "comprises" or "comprising" will be understood to imply the inclusion of stated elements but not the exclusion of any other elements.

In this specification, a mobile station (MS) may refer to a terminal, a mobile terminal (MT), a subscriber station (SS), a portable subscriber station (PSS), user equipment (UE), or an access terminal (AT). The mobile terminal may include all or part of the functions of the mobile station, the subscriber station, the portable subscriber station, and the user equipment. In this specification, a base station (BS) may refer to an access point (AP), a radio access station (RAS), a node B, a base transceiver station (BTS), or an MMR (mobile multihop relay)-BS. The base station may include all or part of the functions of the access point, the radio access station, the node B, the base transceiver station, and the MMR-BS.

Methods for transmitting and receiving a paging message according to exemplary embodiments of the present invention will be described with reference to the drawings.

For paging thorough multiple carriers, a base station has a need to transmit parameters as in Table 2 to a mobile station through a paging group information message, a global carrier configuration message, a multicarrier advertisement message, and others.

TABLE 2

| Parameter | Description |
| --- | --- |
| Multicarrier indication | Indicator for representing whether a base station uses multicarriers for transmitting a paging message |
| Paging carrier indicator | Indicator for representing whether each carrier supports a paging message transmission |
| Physical carrier indicator | Separator Information of carrier used for transmitting a paging message |
| N | The total number of carriers used for transmitting a paging message by a base station |

Next, referring to FIG. 1, a method for transmitting/receiving a paging message according to the first exemplary embodiment of the present invention will be described.

FIG. 1 shows a method for paging according to the first exemplary embodiment of the present invention.

According to an exemplary embodiment of FIG. 1, a base station transmits information for paging through multicarriers to a mobile station by using a paging group information message.

First, the base station determines at least one paging carrier used for transmitting a paging message (S101).

In order to inform the index of the determined paging carrier of a mobile station, the base station generates a paging group information message including information on the paging carrier (S103).

Table 3 shows fields included in the first example of the paging group information message according to the first exemplary embodiment of the present invention.

TABLE 3

| Name | Value |
| --- | --- |
| Num_PGIDs | Number of Paging groups in the base station |
| PGID | Identifier of paging group (0~$2^{16}$) |
| m | Time domain hash parameter (1~4) used to determine the frame number of a superframe for paging message transmission of an idle mode AMS. |
| Multicarrier indication | 0: single carrier base station<br>1: multi-carrier base station |
| Paging carrier indication bit(s) | This bitmap is included if multicarrier indication is set to 1<br>This bitmap is used to specify if a carrier is a paging carrier or not.<br>The size of paging carrier indication bitmap equals $2^k$<br>The value N used to determine the paging carrier index is equal to the number of bits set to 1 |

In Table 3, the multicarrier indication field is set as "1".

The base station transmits information on a paging carrier with a bitmap corresponding to the paging carrier indication bit(s) field to a mobile station.

Figure 2:
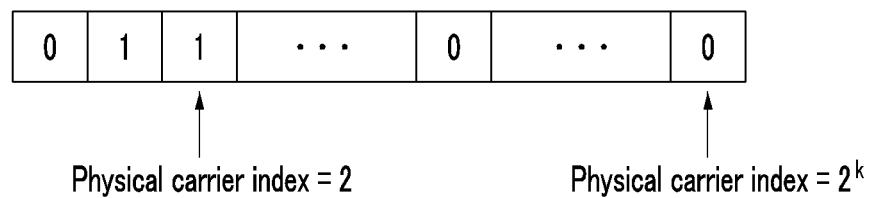
FIG. 2 shows a method for interpreting a bitmap according to the first exemplary embodiment of the present invention.

Referring to FIG. 2, a method for interpreting a bitmap will be described.

FIG. 2 shows a method for interpreting a bitmap according to the first exemplary embodiment of the present invention.

As shown in FIG. 2, the length of the bitmap is the same as the maximum number of carriers that are identifiable by a physical carrier index. That is, a physical carrier index is a k bit, the maximum number is $2^k$, and thus the length of the bitmap is $2^k$. Each bit of the bitmap corresponds to each physical carrier index. The i-th bit with "1" represents that a paging message of a base station is transmitted through a carrier corresponding to a physical carrier index i. In this case, the number of bits with "1" corresponds to the number N of the entire carriers used for transmitting a paging message by a base station.

Table 4 shows fields included in the second example of a paging group information message according to the first exemplary embodiment of the present invention.

TABLE 4

| Name | Value |
| --- | --- |
| Num_PGIDs | Number of paging groups in the base station |
| PGID | Identifier of paging group (0~$2^{16}$) |
| m | Time domain hash parameter (1~4) used to determine the frame number of a superframe for paging message transmission of an idle mode AMS. |
| Multicarrier indication | 0: single carrier base station<br>1: multi-carrier base station |
| Physical carrier index of paging carrier | |
| N | Number of paging carriers |

The paging group information message in Table 4 includes indices of all carriers used for transmitting a paging message. At this time, the paging group information message includes the number N of all carriers used for transmitting a paging message.

The base station transmits the paging group information message to a mobile station in a broadcast fashion (S105).

The mobile station identifies at least one paging carrier index used for transmitting a paging message through the paging group information message (S106).

The mobile station selects one from among the at least one paging carrier index by using a predetermined equation, and monitors a paging message based on the paging transmission carrier corresponding to the selected paging carrier index (S107).

After this, the base station selects a paging transmission carrier for the mobile station from among at least one paging carrier by using a predetermined equation (S109).

The base station transmits a paging message through the selected paging transmission carrier to the mobile station in a broadcast fashion (S111).

Next, referring to FIG. 3, a method for transmitting/receiving a paging message according to the second exemplary embodiment of the present invention will be described.

Figure 3:
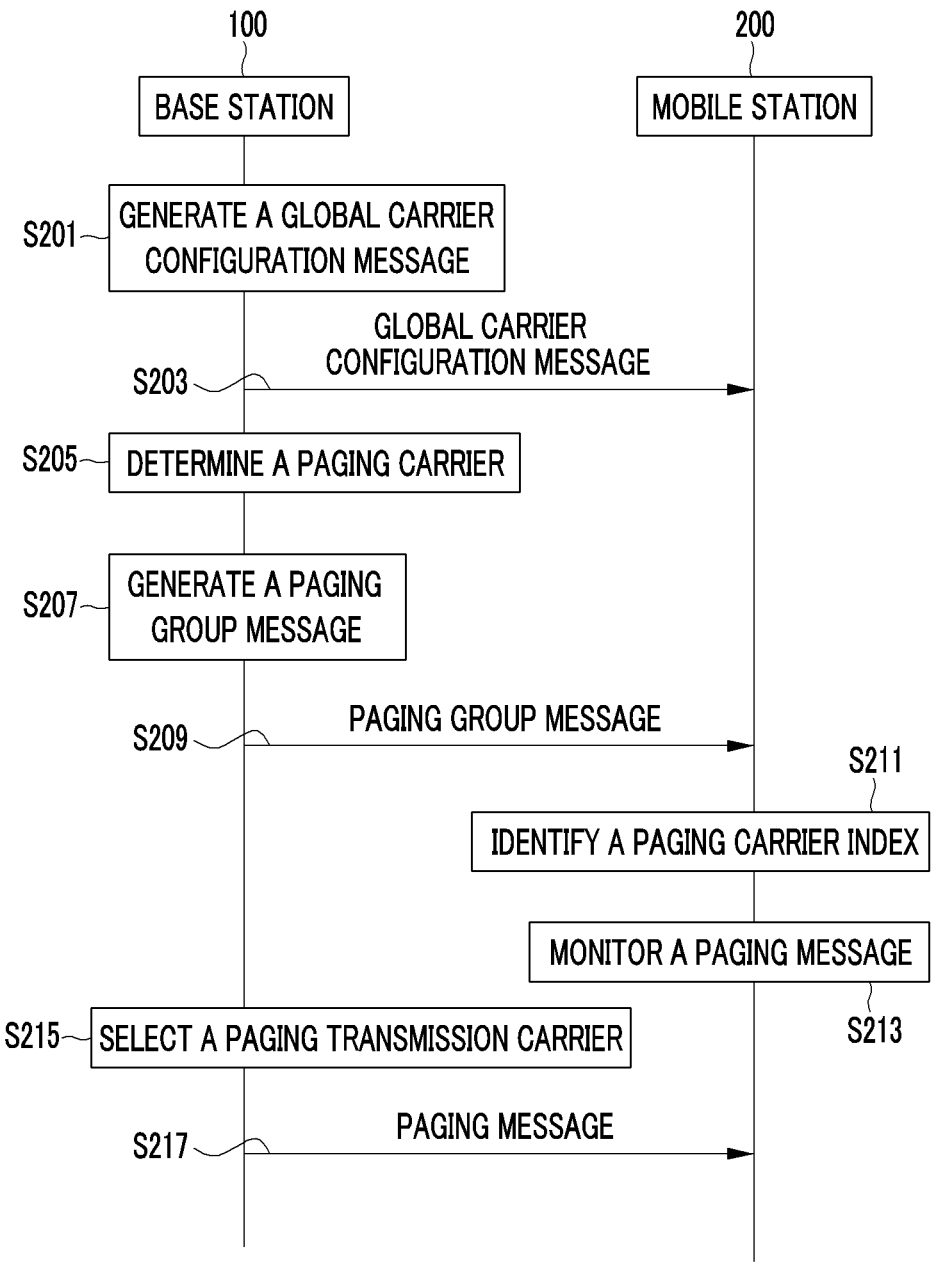
FIG. 3 shows a method for paging according to the second exemplary embodiment of the present invention.

FIG. 3 shows a method for paging according to the second exemplary embodiment of the present invention.

According to the exemplary embodiment as in FIG. 3, a base station transmits information for paging thorough multiple carriers to a mobile station by using a global carrier configuration message and a paging group information message.

First, the base station generates a global carrier configuration message that informs a mobile station about physical carrier indices of all carriers that are available within a network to which the base station belongs (S201), and transmits the global carrier configuration message to the mobile station in a unicast fashion (S203). The mobile station may receive the global carrier configuration message before it is changed to be in an idle mode. Table 5 shows fields included in the global carrier configuration message according to the second exemplary embodiment of the present invention.

TABLE 5

| Field | Size (bit) | Description |
| --- | --- | --- |
| MAC Control Message Type | 8 | |
| Number of Carrier Groups | 4 | Groups of contiguous carriers |
| For(i=0;i<Number of Carrier Groups; i++){ | | |
| Multi-Carrier Configuration Index Across the Network | 6 | |
| Start Frequency Assignment Index | 6 | Frequency Assignment Index of the first carrier in carrier group #i |
| Number of Carriers | 6 | |
| For(j=0;j<Number of Carriers;j++){ | | |
| Physical Carrier Index | 6 | |
| Duplexing Mode | 1 | "0" for TDD<br>"1" for FDD |
| } | | |
| } | | |

As shown in Table 5, the global carrier configuration message according to the second exemplary embodiment of the present invention includes a MAC control message type field, a carrier group number field, a multicarrier configuration index field of each carrier group, a start frequency allocation index field of each carrier group, a carrier number field of each carrier group, physical carrier indices belonging to each carrier group, and a duplexing mode field of each physical carrier index.

The base station determines at least one paging carrier used for transmitting a paging message (S205).

The base station generates a paging group information message to inform a mobile station of at least one paging carrier index (S207).

Table 6 shows fields included in the paging group information message according to the second exemplary embodiment of the present invention.

TABLE 6

| Name | Value |
| --- | --- |
| Num_PGIDs | Number of Paging groups in the base station |
| PGID | Identifier of paging group (0~$2^{16}$) |
| M | Time domain hash parameter (1~4) used to determine the frame number of a superframe for paging message transmission of an idle mode AMS. |
| Multicarrier indication | 0: single carrier base station<br>1: multi-carrier base station |
| Paging carrier indication bit(s) | This bitmap is included if multicarrier indication is set to 1. The size of paging carrier indication bitmap equals the number of carriers in the AAI_Global_Config message<br><br>$$\text{bitmap size} = \left( \sum_{i=1}^{Number\ of\ carrier\ group} \text{Number of carries in group \#i} \right)$$<br><br>The value N used to determine the paging carrier index is equal to the number of bits set to 1 |

In Table 6, the multicarrier indication field is set as "1".

The base station transmits the paging carrier index to the mobile station through a bit map corresponding to the paging carrier indication bit(s) field.

Next, referring to FIG. 4, a method for interpreting a bitmap will be described.

FIG. 4 shoes a method for interpreting a bitmap according to the second exemplary embodiment of the present invention.

As shown in FIG. 4, the length of the bitmap is equal to the number of carriers in the global carrier configuration message. The i-th bit of the bitmap corresponds to the physical carrier index of the i-th carrier in the global carrier configuration message such as the AAI_Global_Config message. That is, the i-th bit set as "1" indicates that the paging message of the base station is transmitted through the i-th carrier of the global carrier configuration message (AAI_Global_Config message). In this case, the number of bits set as "1" corresponds to the number N of all carriers that the base station uses to transmit a paging message.

The base station transmits the generated paging group information message to the mobile station in a broadcast fashion (S209).

The mobile station identifies an index of at least one paging carrier used for transmitting a paging message through the global carrier configuration message and the paging group information message (S211).

The mobile station selects one from among at least one paging carrier index by using a predetermined equation, and monitors a paging message through the paging transmission carrier corresponding to the selected paging carrier index (S213).

Next, the base station selects a paging transmission carrier for the mobile station from among the at least one paging carrier with a predetermined equation (S215).

The base station transmits a paging message to the mobile station through the selected paging transmission carrier in a broadcast fashion (S217).

Next, referring to FIG. 5, a method for transmitting/receiving a paging message according to the third exemplary embodiment of the present invention will be described.

Figure 5:
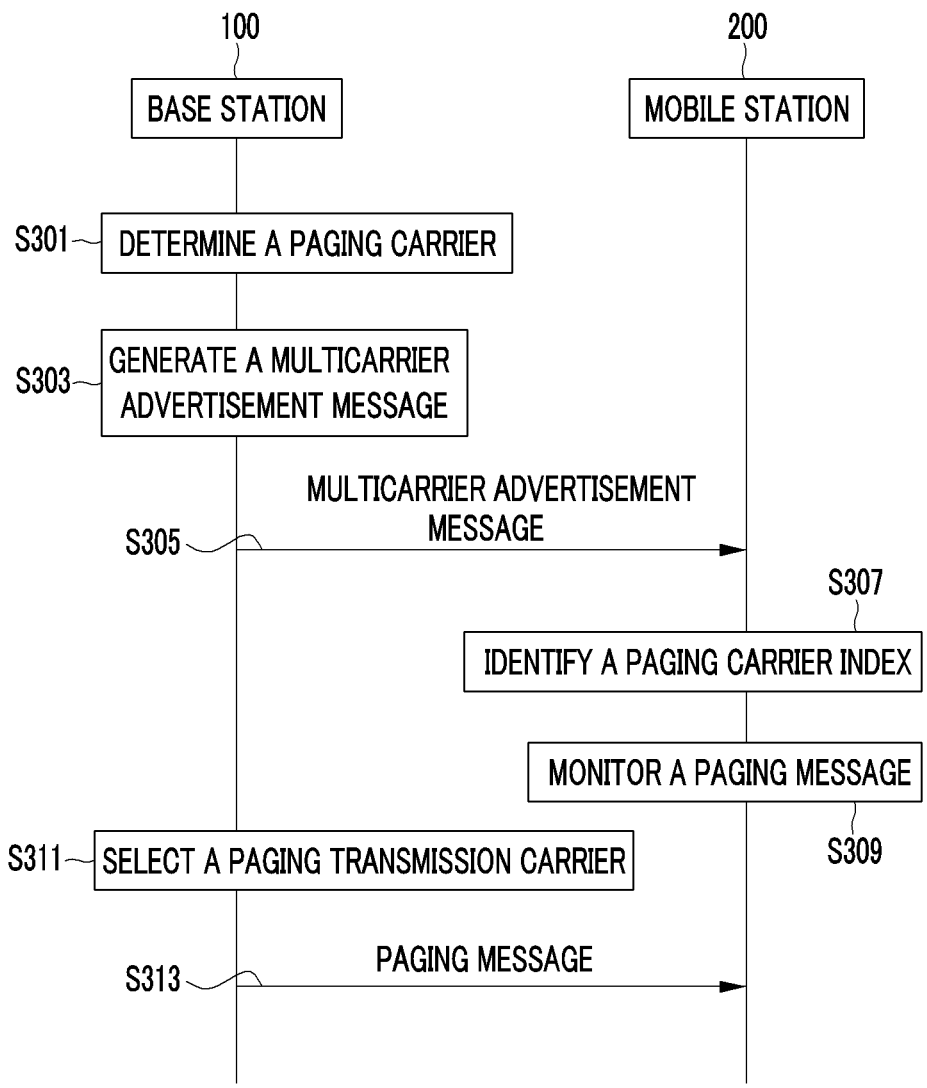
FIG. 5 shows a method for paging according to the third exemplary embodiment of the present invention.

FIG. 5 shows a method for paging according to the third exemplary embodiment of the present invention.

According to the exemplary embodiment as in FIG. 5, a base station transmits information for paging through multi-carriers to a mobile station by using a multicarrier advertisement message.

First, the base station determines at least one paging carrier used for transmitting a paging message (S301).

The base station generates a multicarrier advertisement message to inform physical carrier indices of carriers supported by the base station and at least one paging carrier index (S303), and transmits the multicarrier advertisement message to the mobile station in a broadcast fashion (S305). The mobile station receives the multicarrier advertisement message before it is changed to be in an idle mode. In the other hand, when the mobile station in an idle mode does not receive the multicarrier advertisement message, the mobile station may perform a procedure for requesting corresponding information from the base station. Table 7 shows fields included in the multicarrier advertisement message according to the third exemplary embodiment of the present invention.

TABLE 7

| Field | Size (bit) | Description |
| --- | --- | --- |
| Multi-carrier Configuration change count | 4 | Incremented by 1 upon each update |
| Serving BS Carrier Number | 3 | |
| MAC protocol version | 8 | Consistent with REV.2 definition, with new MAC protocol version 9 defined for 16m |

TABLE 7-continued

| Field | Size (bit) | Description |
| --- | --- | --- |
| For(i=1;i<=Serving BS Carrier Number−1;i++){ | | |
|   Physical carrier index | 6 | //physical carrier index in AAI_Global-Config message |
|   SA-Preamble Index | 10 | |
|   Paging carrier Indication bits | 1 | This bit is used to specify if a carrier is a paging carrier or not. 1: the corresponding carrier is a paging carrier |
|   SFH information | | |
| } | | |

As shown in Table 7, the multicarrier advertisement message according to the third exemplary embodiment of the present invention includes a multicarrier configuration change count field, a serving base station carrier number field, a MAC protocol vision field, a physical carrier index field of each serving base station carrier, a secondary advanced preamble index field of each serving base station carrier such as an SA-Preamble index, a paging carrier indication field of each serving base station carrier, and a superframe header information field.

The paging carrier indication filed set as "1" represents that a paging message is transmitted through a related serving base station carrier.

In Table 7, the number N of carriers used for transmitting a paging message corresponds to the number of carriers corresponding to the paging carrier indication fields that are set as "1".

The mobile station identifies at least one paging carrier index used for transmitting a paging message through the multicarrier advertisement message (S307).

The mobile station selects one from among the at least one paging carrier index by using a predetermined equation, and monitors a paging message based on the paging transmission carrier corresponding to the selected paging carrier index (S309).

After this, the base station selects a paging transmission carrier for the mobile station from among at least one paging carrier with a predetermined equation (S311).

The base station transmits a paging message through the selected paging transmission carrier to the mobile station in broadcast fashion (S313).

Nest, referring to FIG. 6, a method for transmitting/receiving a paging message according to the fourth exemplary embodiment of the present invention will be described.

Figure 6:
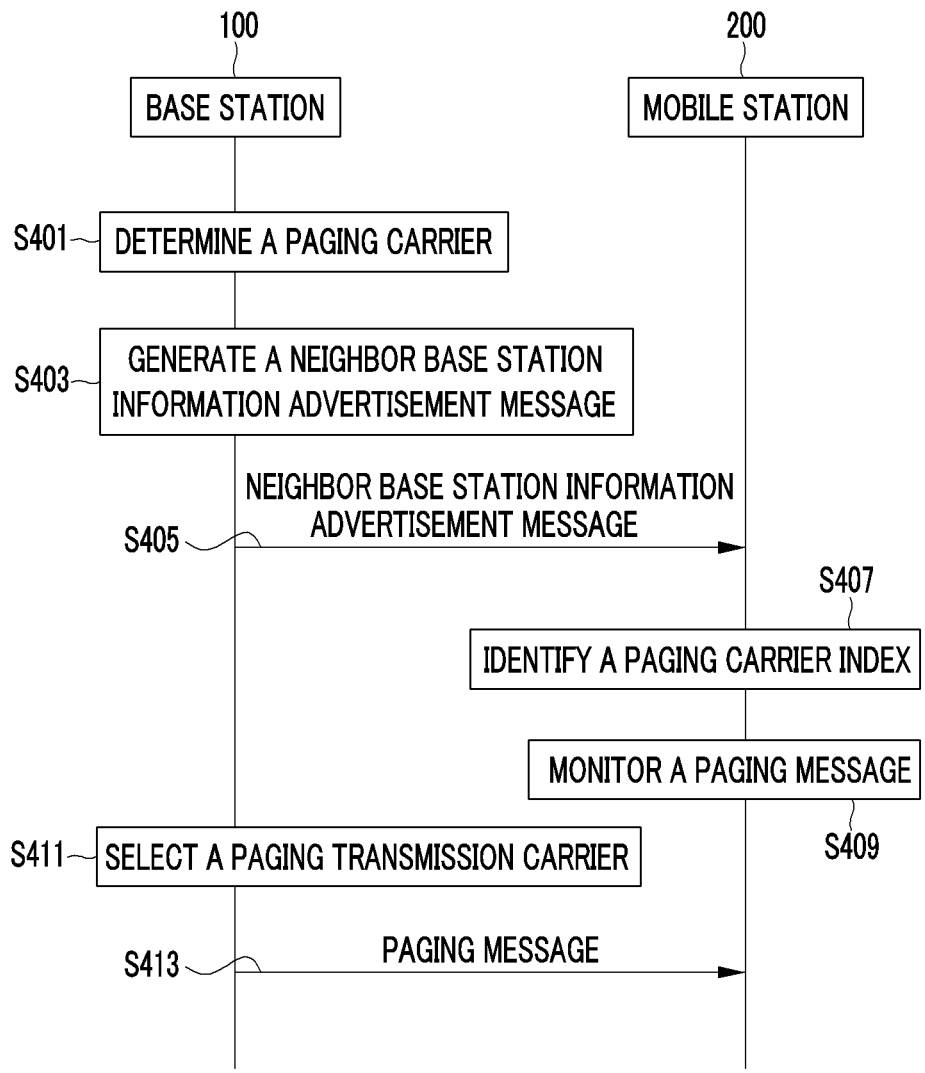
FIG. 6 shows a method for paging according to the fourth exemplary embodiment of the present invention.

FIG. 6 shows a method for paging according to the fourth exemplary embodiment of the present invention.

According to the exemplary embodiment as in FIG. 6, a base station transmits information for paging thorough multiple carriers by using a neighbor base station information advertisement message such as an AAI_NBR-ADV message.

First, the base station determines at least one paging carrier used for transmitting a paging message (S401).

The base station generates a neighbor base station information advertisement message to inform information on neighbor base stations and the determined at least one paging carrier index (S403), and transmits the neighbor base station information advertisement message to the mobile station in a broadcast fashion or a unicast fashion (S405). The mobile station receives the neighbor base station information advertisement message before it is changed to be in an idle mode. In the other hand, when the mobile station in an idle mode does not receive the neighbor base station information advertisement message, the mobile station may perform a procedure for requesting corresponding information from the base station.

Table 8 shows fields included in the neighbor base station information advertisement message according to the fourth exemplary embodiment of the present invention.

TABLE 8

| Syntax | Size | Note |
|---|---|---|
| AAI_NBR-ADV_Message_format( ){ | ... | ... |
| Management Message Type = NN | 8 | |
| Change count | 3 | |
| Cell type | 3 | |
| Total Number of AAI_NBR-ADV segments | 4 | |
| AAI_NBR-ADV Segment Index | 4 | |
| BS number M | 8 | |
| Starting ABS index | 8 | |
| For(i=0;i<M;i++){ | | |
|   BSID | 48 | |
|   Number of carriers($N_C$) | | |
|   For(j=0;j<Nc;j++){ | | |
|     SA-PREAMBLE index | 10 | |
|     A-PREAMBLE transmit power | 8 | |
|     Physical carrier index | 6 | Refers to the physical carrier index in AAI_Global-Config message |
|     MAC protocol versions | 8 | MAC protocol version of the BS consistent with REV.2 definition, with new MAC protocol version 9 defined for 16m |
|     Paging carrier indication | 1 | This bit is used to specify if a carrier is a paging carrier or not. 1: the corresponding carrier is specify if a paging carrier |
| } | | |
| ... | ... | ... |

As shown in Table 8, the neighbor base station information advertisement message according to the fourth exemplary embodiment of the present invention includes a management message type field, a change count field, a cell type field, a message segment total number field, a segment index field, a base station number field, a stat base station index field, a base station identifier field of each base station, a carrier number field of each base station, a SA-PREAMBLE index field for a carrier of each base station, a preamble transmission power field for a carrier of each base station such as an A-PREAMBLE transmit power field, a physical carrier index field for a carrier of each base station, a MAC protocol version field for a carrier of each base station, and a paging carrier indication field for a carrier of each base station.

The paging carrier indication field set as "1" represents that a paging message may be transmitted through the carrier corresponding to the related physical carrier index.

The mobile station identifies at least one paging carrier index used for transmitting a paging message through the neighbor base station information advertisement message (S407). Particularly, the mobile station identifies physical carrier indices of carriers used by the corresponding base station from the base station identifier field. Also, the mobile station identifies physical carrier indices of paging carriers used by the corresponding base station from the base station identifier field. The number N of carriers that the base station uses to transmit a paging message corresponds to the number of carriers corresponding to the paging carrier indication fields that are set as "1".

The mobile station selects one from among at least one paging carrier index with a predetermined equation, and monitors a paging message through the paging transmission carrier corresponding to the selected paging carrier index (S409).

After this, the base station selects a paging transmission carrier for the mobile station from among the at least one paging carrier with a predetermined equation (S411).

The base station transmits a paging message to the mobile station through the selected paging transmission carrier in a broadcast fashion (S413).

Next, referring to FIG. 7, a method for transmitting/receiving a paging message according to the fifth exemplary embodiment of the present invention will be described.

Figure 7:
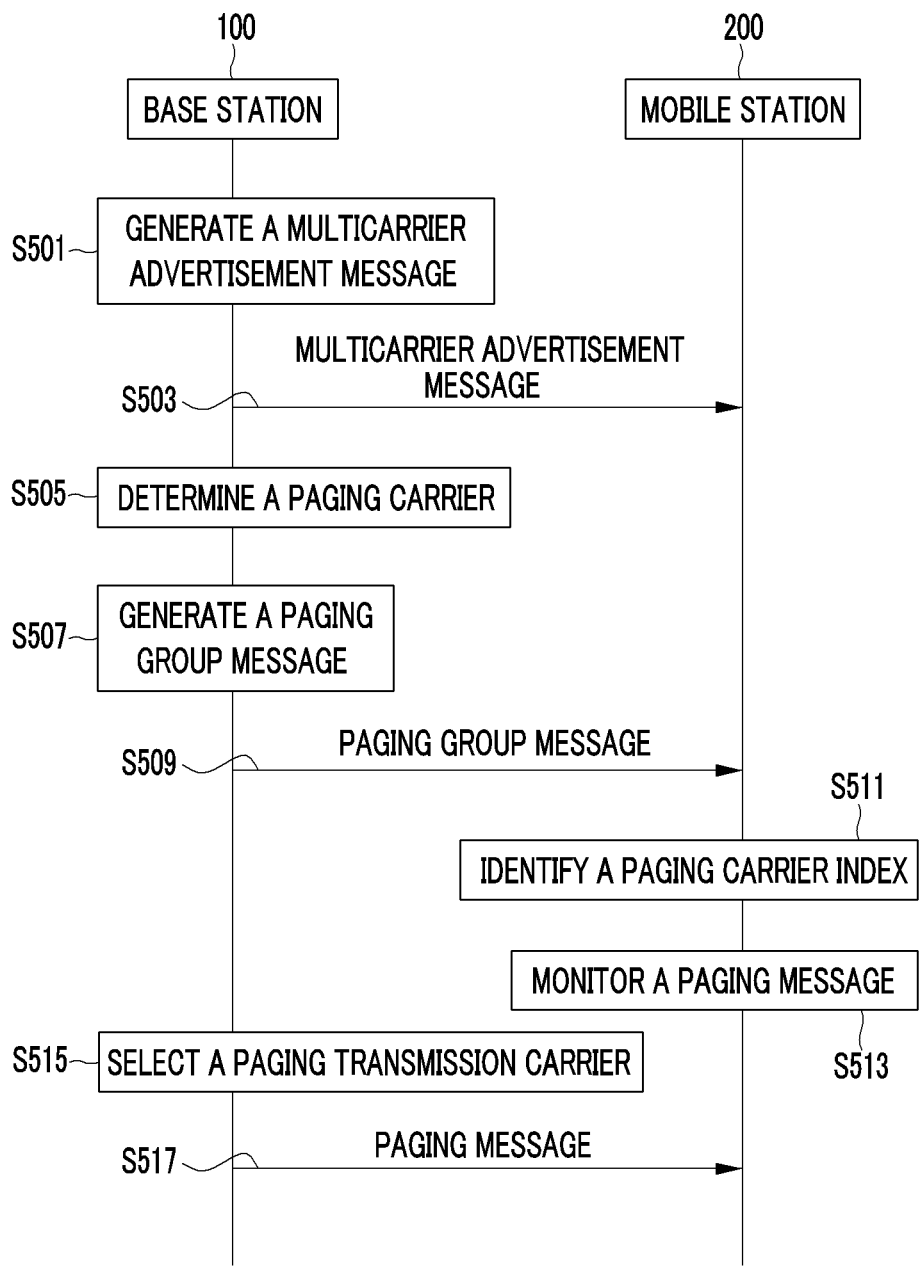
FIG. 7 shows a method for paging according to the fifth exemplary embodiment of the present invention.

FIG. 7 shows a method for paging according to the fifth exemplary embodiment of the present invention.

According to the exemplary embodiment as in FIG. 7, a base station transmits information for paging through multicarriers to a mobile station by using a multicarrier advertisement message and a paging group information message.

First, the base station generates a multicarrier advertisement message to inform physical carrier indices of carriers supported by the base station (S501), and transmits the multicarrier advertisement message to a mobile station in a broadcast fashion (S503). The mobile station may receive the multicarrier advertisement message before it is changed to be in an idle mode. In the other hand, when the mobile station in an idle mode does not receive the multicarrier advertisement message, the mobile station may perform a procedure for requesting corresponding information from the base station.

Table 9 shows fields included in the multicarrier advertisement message according to the fifth exemplary embodiment of the present invention.

TABLE 9

| Field | Size (bits) | Description |
|---|---|---|
| Multi-carrier Configuration change count | 4 | Incremented by 1 upon each update |
| Serving BS Carrier Number | 3 | |
| MAC protocol version | 8 | Consistent with REV.2 definition, with new MAC protocol version 9 defined for 16m |
| For(i=1;i<=Serving BS Carrier Number-1;i++){ | | |
|   Physical carrier index | 6 | //physical carrier index in AAI_Global-Config message |
|   SA-Preamble Index | 10 | |
|   SFH information | | |
| } | | |

As in Table 9, the multicarrier advertisement message according to the fifth exemplary embodiment of the present invention includes a multicarrier configuration change count field, a serving base station carrier number field, a MAC protocol version field, a physical carrier index field of each serving base station carrier, a preamble index field of each serving base station carrier, and a super frame header information field of each serving base station carrier.

The base station determines at least one paging carrier used for transmitting a paging message (S505).

The base station generates a paging group information message to inform a mobile station of at least one paging carrier index (S507).

Table 10 shows fields included in the paging group information message according to the fifth exemplary embodiment of the present invention.

TABLE 10

| Name | Value |
|---|---|
| Num_PGIDs | Number of Paging groups in the base station |
| PGID | Identifier of paging group(0~$2^{16}$) |
| m | Time domain hash parameter (1~4) used to determine the frame number of a superframe for paging message transmission of an idle mode AMS. |
| Multicarrier indication | 0: single carrier base station<br>1: multi-carrier base station |
| Paging carrier indication bit(s) | This bitmap is included if multicarrier indication is set to 1<br>The size of paging carrier indication bitmap equals to the number of carriers in the AAI_MC-ADV message (Serving BS Carrier Number)<br>The value N used to determine the paging carrier index is equal to the number of bits set to 1 |

As shown in Table 10, the paging group information message according to the fifth exemplary embodiment of the present invention includes a paging group number field, a paging group identifier field of each paging group, a time domain hash parameter field (m), a multicarrier indication field, and a paging carrier indication bitmap field.

In Table 10, the multicarrier indication field is set as "1".

The base station may inform a mobile station about an index of a paging carrier through a paging carrier indication bitmap.

Next, referring to FIG. 8, a method for interpreting a bitmap will be described.

FIG. 8 shows a method for interpreting a bitmap according to the fifth exemplary embodiment of the present invention.

As shown in FIG. 8, the bitmap length is equal to the number of carriers in the multicarrier advertisement message. The i-th bit of the bitmap corresponds to the physical carrier index of the i-th carrier in the multicarrier advertisement message. That is, the i-th bit set as "1" represents that a paging message of a base station is transmitted through the i-th carrier in the multicarrier advertisement message. In this case, the number of bits with "1" corresponds to the total number N of all carriers used for transmitting a paging message by the base station.

FIG. 7 will be described again.

The base station transmits the generated paging group information message to the mobile station in a broadcast fashion (S509).

The mobile station identifies at least one paging carrier index used for transmitting a paging message through the multicarrier advertisement message and the paging group information message (S511).

The mobile station selects one from among the at least one paging carrier index by using a predetermined equation, and monitors a paging message based on the paging transmission carrier corresponding to the selected paging carrier index (S513).

After this, the base station selects a paging transmission carrier for the mobile station from among at least one paging carrier with a predetermined equation (S515).

The base station transmits a paging message through the selected paging transmission carrier to the mobile station in a broadcast fashion (S517).

Next, referring to FIG. 9, a method for transmitting/receiving a paging message according to the sixth exemplary embodiment of the present invention will be described.

Figure 9:
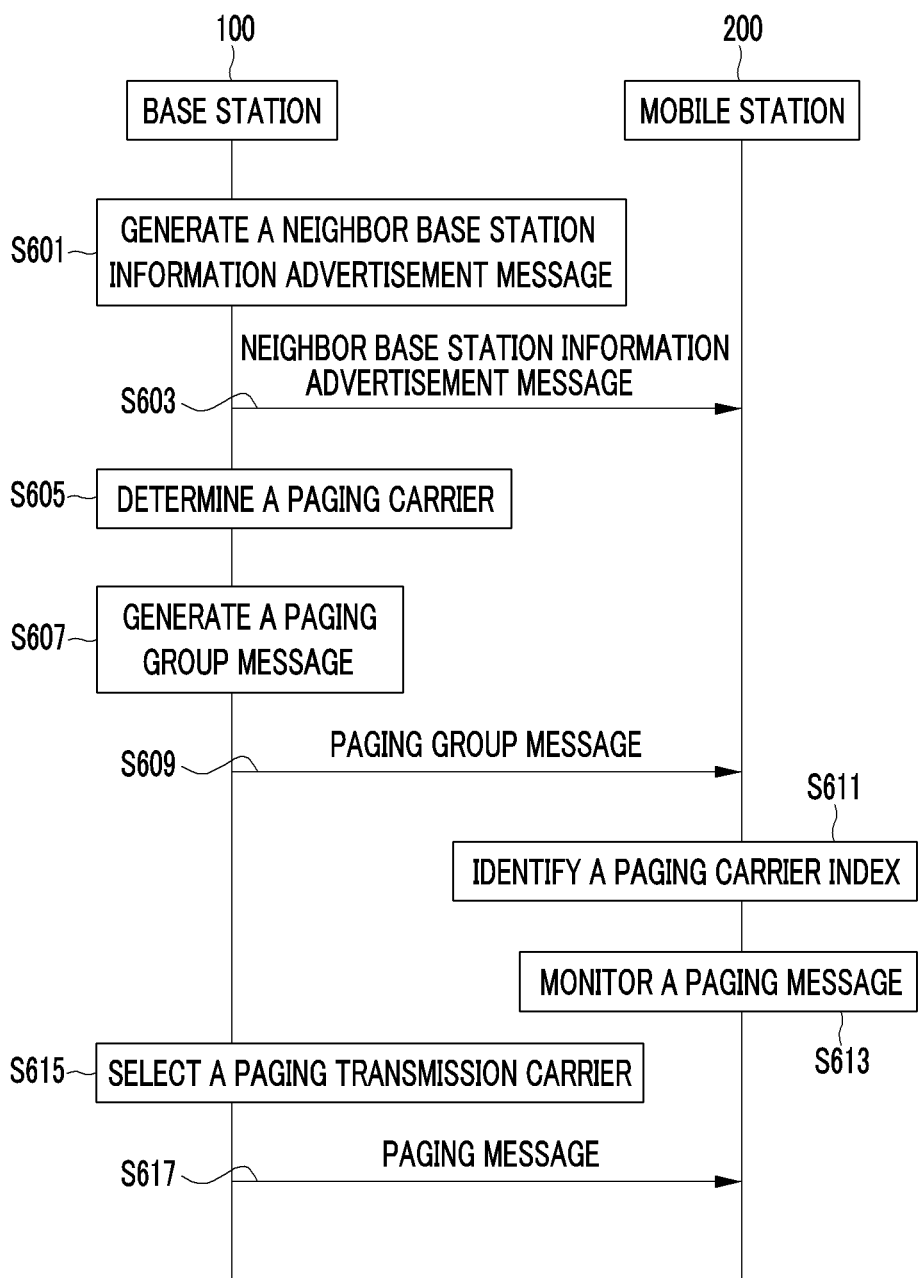
FIG. 9 shows a method for paging according to the sixth exemplary embodiment of the present invention.

FIG. 9 shows a method for paging according to the sixth exemplary embodiment of the present invention.

According to the exemplary embodiment as in FIG. 9, a base station transmits information for paging thorough multiple carriers to a mobile station by using a neighbor base station information advertisement message and a paging group information message.

First, the base station generates a neighbor base station information advertisement message that informs a mobile station about physical carrier indices of carriers supported by neighbor base stations (S601), and transmits the neighbor base station information advertisement message to the mobile station in a broadcast fashion or a unicast fashion (S603). The mobile station may receive the neighbor base station information advertisement message before it is changed to be in an idle mode. In the other hand, when the mobile station in an idle mode does not receive the neighbor base station information advertisement message, the mobile station may perform a procedure for requesting corresponding information from the base station.

Table 11 shows fields included in the neighbor base station information advertisement message according to the sixth exemplary embodiment of the present invention.

TABLE 11

| syntax | Size | Note |
|---|---|---|
| AAI_NBR-ADV_Message_format( ){ | ... | ... |
| Management Message Type = NN | 8 | |
| Change count | 3 | |
| Cell type | 3 | |
| Total Number of AAI_NBR-ADV segments | 4 | |
| AAI_NBR-ADV Segment Index | 4 | |
| BS number M | 8 | |
| Starting ABS index | 8 | |
| For(i=0;i<M;i++){ | | |
|   BSID | 48 | |
|   Number of carriers(NC) | | |
|   For(j=0;j<Nc;j++){ | | |
|     SA-PREAMBLE index | 10 | |
|     A-PREAMBLE transmit power | 8 | |
|     Physical carrier index | 6 | Refer to the physical carrier index in AAI_Global-Config message |
|     MAC protocol versions | 8 | MAC protocol version of the BS consistent with REV.2 definition, with new MAC protocol version 9 defined for 16m |
|   } | | |
| ... | ... | ... |

As shown in Table 11, the neighbor base station information advertisement message according to the sixth exemplary embodiment of the present invention includes a management message type field, a change count field, a cell type field, a message segment total number field, a segment index field, a base station number field, a start base station index field, a base station identifier field of each base station, a carrier number field of each base station, a preamble index field for each carrier of each base station, a preamble transmission power field for each carrier of each base station such as an A-PREAMBLE transmit power field, a physical carrier index field for each carrier of each base station, and a MAC protocol version field for each carrier of each base station.

In the other hand, the base station determines at least one paging carrier used for transmitting a paging message (S605).

The base station generates a paging group information message to inform a mobile station of the determined at least one paging carrier index (S607).

Table 12 shows fields included in the paging group information message according to the sixth exemplary embodiment of the present invention.

TABLE 12

| Name | Value |
|---|---|
| Num_PGIDs | Number of Paging groups in the base station |
| PGID | Identifier of paging group (0~2$^{16}$) |
| m | Time domain hash parameter (1~4) used to determine the frame number of a superframe for paging message transmission of an idle mode AMS. |
| Multicarrier indication | 0: single carrier base station<br>1: multi-carrier base station |
| Paging carrier indication bit(s) | This bitmap is included if multicarrier indication is set to 1<br>The size of paging carrier indication bitmap equals the number of carriers in the AAI_NBR_ADV message(NC)<br>The value N used to determine the paging carrier index is equal to the number of bits set to 1 |

As shown in Table 12, the paging group information message according to the sixth exemplary embodiment of the present invention includes a paging group number field, a paging group identifier field of each paging group, a time domain hash parameter field (m), a multicarrier indication field, and a paging carrier indication bitmap field.

In Table 12, the multicarrier indication field is set as "1".

The base station may inform a mobile station about an index of a paging carrier through a paging carrier indication bitmap.

Next, referring to FIG. 10, a method for interpreting a bitmap will be described.

FIG. 10 shows a method for interpreting a bitmap according to the sixth exemplary embodiment of the present invention.

As shown in FIG. 10, the bitmap length is equal to the number of serving base station carriers in the neighbor base station information advertisement message. The i-th bit of the bitmap corresponds to the physical carrier index of the i-th serving base station carrier in the neighbor base station information advertisement message. That is, the i-th bit set as "1" represents that a paging message of a base station is transmitted through the i-th serving base station carrier in the neighbor base station information advertisement message. In this case, the number of bits with "1" corresponds to the total number N of all serving base station carriers used for transmitting a paging message by the base station.

FIG. 9 will be described again.

The base station transmits the generated paging group information message to a mobile station in a broadcast fashion (S609).

The mobile station identifies at least one paging carrier index used for transmitting a paging message through the neighbor base station information advertisement message and the paging group information message (S611).

The mobile station selects one from among the at least one paging carrier index by using a predetermined equation, and monitors a paging message based on the paging transmission carrier corresponding to the selected paging carrier index (S613).

After this, the base station selects a paging transmission carrier for the mobile station from among at least one paging carrier with a predetermined equation (S615).

The base station transmits a paging message through the selected paging transmission carrier to the mobile station in broadcast fashion (S617).

The mobile station in an idle mode may inform the base station of the necessity of information on paging carriers through a location update procedure when a carrier does not support paging after receiving the paging group information message through the carrier. At this time, a message for location update includes a paging carrier index request. If a panging carrier index request field is set, it represents that a mobile station requests to provide information on paging carriers.

In addition to the described exemplary embodiments, it is possible to use a method that determines a paging transmission carrier and then informs a mobile station which is entering to an idle mode thereof.

Next, referring to FIG. 11 and FIG. 12, the structure of a base station 100 and a mobile station 200 according to an exemplary embodiment of the present invention will be described.

FIG. 11 shows a structure of a base station according to an exemplary embodiment of the present invention.

As shown in FIG. 11, the base station 100 according to an exemplary embodiment of the present invention includes a paging carrier determining unit 101, a paging group information message generator 103, a paging group information message transmitter 105, a global carrier configuration message generator 107, a global carrier configuration message transmitter 109, a multicarrier advertisement message generator 111, a multicarrier advertisement message transmitter 113, a neighbor base station information advertisement message generator 115, a neighbor base station information advertisement message transmitter 117, a paging transmission carrier selector 119, a paging message generator 121, and a paging message transmitter 123.

The paging carrier determining unit 101 determines at least one paging carrier used for transmitting a paging message.

The paging group information message generator 103 generates a paging group information message. At this time, the paging group information message may include information for informing the mobile station 200 of the index of the paging carrier.

The paging group information message transmitter 105 transmits the paging group information message to the mobile station 200 in a broadcast fashion.

The global carrier configuration message generator 107 generates a global carrier configuration message. At this time, the global carrier configuration message may include information for informing the mobile station 200 of the index of the paging carrier.

The global carrier configuration message transmitter 109 transmits the global carrier configuration message to the mobile station 200 in a unicast fashion.

The multicarrier advertisement message generator 111 generates a multicarrier advertisement message. At this time, the multicarrier advertisement message may include information for informing the mobile station 200 of the index of the paging carrier.

The multicarrier advertisement message transmitter 113 transmits the multicarrier advertisement message to the mobile station 200 in a broadcast fashion.

The neighbor base station information advertisement message generator 115 generates a neighbor base station information advertisement message. At this time, the neighbor base station information advertisement message may include information for informing the mobile station 200 of the index of the paging carrier.

The neighbor base station information advertisement message transmitter 117 transmits the base station information advertisement message to the mobile station 200 in a broadcast fashion or a unicast fashion.

The paging transmission carrier selector 119 selects a paging transmission carrier for the mobile station 200 from among a plurality of paging carriers.

The paging message generator 121 generates a paging message.

The paging message transmitter 123 transmits a paging message to the mobile station 200 through the selected paging transmission carrier in a broadcast fashion.

FIG. 12 shows a structure of a mobile station according to an exemplary embodiment of the present invention.

As shown in FIG. 12, the mobile station 200 according to an exemplary embodiment of the present invention includes a paging group information message receiver 201, a global carrier configuration message receiver 203, a multicarrier advertisement message receiver 205, a neighbor base station information advertisement message receiver 207, a paging carrier identifying unit 209, a paging transmission carrier selector 211, and a paging message receiver 213.

The paging group information message receiver 201 receives the paging group information message.

The global carrier configuration message receiver 203 receives the global carrier configuration message.

The multicarrier advertisement message receiver 205 receives the multicarrier advertisement message.

The neighbor base station information advertisement message receiver 207 receives the neighbor base station information advertisement message.

The paging carrier identifying unit 209 identifies indices of a plurality of paging carriers by using information included in the paging group information message, the global carrier configuration message, the multicarrier advertisement message, and the neighbor base station information advertisement message.

The paging transmission carrier selector 211 selects a paging transmission carrier for the mobile station 200 from among the plurality of paging carriers.

The paging message receiver 213 monitors the paging transmission carrier to receive a paging message through the paging transmission carrier.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for a base station to transmit a paging message, comprising:
   transmitting a first message including indices of a plurality of carriers and information for the plurality of carriers to a mobile station;
   transmitting a second message including a bitmap representing whether each of the plurality of carriers corresponds to a paging carrier used for transmitting the paging message, to the mobile station;
   selecting a paging transmission carrier for the mobile station from among at least one paging carrier; and
   transmitting the paging message through the paging transmission carrier,
   wherein the first message corresponds to a message for providing information on all available carriers, and the size of the bitmap is equal to the number of all the available carriers.

2. The method of claim 1, wherein the second message further includes paging group information.

3. The method of claim 2, wherein the second message is transmitted in a broadcast fashion.

4. The method of claim 1, wherein the first message is transmitted in a unicast fashion.

5. A method for a mobile station to receive a paging message, comprising:
   receiving a first message including indices of a plurality of carriers and information for the plurality of carriers from a base station;
   receiving a second message including a bitmap representing whether each of the plurality of carriers corresponds to a paging carrier used for transmitting the paging message, from the base station;
   selecting a paging transmission carrier for the mobile station from among at least one paging carrier; and
   monitoring the paging message through the paging transmission carrier,
   wherein the first message corresponds to a message for providing information on all available carriers, and the size of the bitmap is equal to the number of all the available carriers.

6. The method of claim 5, wherein the second message further includes paging group information.

7. The method of claim 5, wherein the second message is transmitted in a broadcast fashion.

8. The method of claim 5, wherein the first message is transmitted in unicast fashion.

9. A base station, comprising:
   a first message transmitter for transmitting a first message including indices of a plurality of carriers to a mobile station;
   a second message transmitter for transmitting a second message including information representing whether each of the plurality of carriers is used for transmitting a paging message, to the mobile station; and
   a paging message transmitter for transmitting the paging message through at least one among a plurality of carriers used for transmitting the paging message,
   wherein the information representing whether each of the plurality of carriers is used for transmitting the paging message corresponds to a bitmap, and the size of the bitmap is equal to the number of all the available carriers.

10. The base station of claim 9, wherein the second message corresponds to a broadcast message further including paging group information.

11. The base station of claim 9, wherein the first message corresponds to a unicast message for providing information on all available carriers.

12. A mobile station, comprising:
   a first message receiver for receiving a first message including indices of a plurality of carriers and information for the plurality of carriers from a base station;
   a second message receiver for receiving a second message including information representing whether each of the plurality of carriers is used for transmitting a paging message, from the base station; and a paging message receiver for receiving the paging message through at least one among a plurality of carriers used for transmitting the paging message, wherein the first message corresponds to a unicast message for providing information of all available carriers, the information representing whether each of the plurality of carriers is used for transmitting a paging message corresponds to a bitmap, and the size of the bitmap is equal to the number of all the available carriers.

13. The mobile station of claim 12, wherein the second message corresponds to a broadcast message further including paging group information.

14. A method for a base station to transmit a paging message, comprising:

transmitting a first message including indices of a plurality of carriers and a bit representing whether each of the plurality of carriers corresponds to a paging carrier used for transmitting the paging message, to a mobile station;

selecting a paging transmission carrier for the mobile station among one or more paging carriers; and transmitting the paging message through the paging transmission carrier, wherein the plurality of carriers correspond to carriers supported by a neighbor base station, and the first message corresponds to a message for providing carrier information of the neighbor base station.

* * * * *